United States Patent Office 3,141,824
Patented July 21, 1964

3,141,824
PERTUSSIS ANTIGEN
Robert V. Dahlstrom, Manitowoc, Wis., assignor to Eli Lilly and Company, Indianapolis, Ind., a corporation of Indiana
No Drawing. Filed May 19, 1961, Ser. No. 111,163
4 Claims. (Cl. 167—78)

The present invention relates to Bordetella pertussis antigen and to an improved method for its preparation and extraction.

One of the more serious diseases of infancy is whooping cough, which is caused by the organism Bordetella pertussis. Immunization against this disorder has been accomplished in the past by injection of either killed-cell vaccine or extracted antigen. Until the present time, however, the available preparations have had certain shortcomings, in particular a tendency to produce side reactions such as fever, irritation, inflammation, necrosis, and even encephalitis.

An object of the present invention is to provide a B. pertussis antigen of substantially improved form, having a markedly reduced tendency to produce side effects, while providing long-term immunity against whooping cough.

Another object is to provide a B. pertussis antigen which is essentially free from cell debris and other substances which tend to produce side reactions in the human body.

Another object is to improve the preparation and extraction of B. pertussis antigen.

Other objects will be apparent from the appended description and example.

In one embodiment of the present invention, an extracted B. pertussis antigen is prepared according to the following procedure:

B. pertussis is grown upon the surface of a solid agar culture medium, and the cells are harvested by washing with saline solution. The cells are separated from the harvest fluids, and are resuspended in 1 M saline solution having a pH of about 10. The resulting suspension is refrigerated at a temperature below about 10° C. for a period of about 24 hours, during which time substantially complete extraction of the antigen takes place. The suspension is preferably adjusted to around pH 7 with sterile acid at this point, and the exhausted cells are separated and discarded. The liquid thus obtained contains the greater part of the antigens present in the original bacterial cell suspension, and has an antigenic potency proportional to the original quantity of cells.

The solution is standardized according to the procedures prescribed by the National Institutes of Health, in which serial dilutions are injected into mice to produce immunity against challenge doses of virulent pertussis organisms. After standardization, the antigenic liquid can be adjusted to the desired strength by dilution or by conventional freeze-drying methods, and can be protected against contamination by addition of an effective amount of a preservative such as thimerosal or Imistat (1-methyl-3-undecyl-3-benzylimidazolium bromide). The liquid can be treated with alum, if desired, according to conventional procedures to produce an alum-precipitated vaccine, or with aluminum hydroxide, aluminum phosphate, or other solid adjuvant to produce an adsorbed vaccine preparation. In any case, the completed vaccine is filled under aseptic conditions into dosage containers suitable for distribution to the trade. The vaccine can be combined, if desired, with one or more other vaccines, such as vaccines for diphtheria, tetanus, poliomyelitis, and measles, to provide a polyvalent vaccine in unitary dosage form.

The present invention has a number of distinct advantages. The method employed is simply and easily carried out, and produces a maximum recovery of antigen while minimizing the risk of contamination and the proportion of inactive materials. The product is essentially free from nutrient medium, cells, cell debris, and extraneous chemical substances, with consequent minimization of the tendency to produce side effects upon injection into the human body. Finally, the product is stable upon prolonged storage.

In a preferred method for preparing inoculum for the present invention, an agar slant is streaked with a culture of an antigenic strain of B. pertussis in phase I, and the slant is incubated at around 35 to 37° C. until visible growth has taken place. The organisms are then washed from the surface of the agar with physiological saline solution, and the resulting suspension is used to inoculate the growth flasks.

Alternatively, a suitable liquid medium such as the modified Cohen-Wheeler medium can be inoculated and similarly incubated to yield a culture suitable as such for inoculating the growth flasks.

For large-scale growth of the organism, Povitsky bottles are suitable, containing a solid nutrient medium such as charcoal agar, starch agar, or the like. The surface of the medium is flooded with the inoculum suspension, and the bottles are incubated at around 35 to 37° C. until confluent growth of the organism has been reached, judged by visual inspection, around 20 to 60 hours being generally sufficient for this purpose. The cells are then harvested by washing with physiological saline solution. The harvested suspensions are pooled, and the cell concentration is conveniently measured in terms of opacity units per milliliter, as measured by comparison with opacity standards provided by the National Institutes of Health. The suspension is filtered or preferably centrifuged, and the supernatant is discarded.

The cells are resuspended in physiological saline solution to a cell concentration around 125 opacity units per milliliter, corresponding to a cell count of about 125 billion per milliliter. To the suspension is added sterile concentrated sodium chloride solution in a quantity and concentration sufficient to produce a final concentration of about 1 M sodium chloride at 100 opacity units per milliliter, and also sterile trisodium orthophosphate solution in a quantity and concentration sufficient to produce a final concentration of about 0.01 M sodium orthophosphate at 100 opacity units per milliliter. Finally, the cell concentration is adjusted to 100 opacity units per milliliter by addition of a sufficient quantity of physiological saline solution. The completed mixture is adjusted to the pH range of about 9.8 to about 10.2 by addition of sterile sodium hydroxide solution or hydrochloric acid as required, and is placed under refrigeration at about 2 to 10° C. for around 20 to 30 hours. At the end of this time, sterile hydrochloric acid is added to pH 6.7–7.3, and the mixture is centrifuged for 1.5–2 hours. The supernatant (containing the extracted antigen) is withdrawn and protected against contamination by adding thimerosal to a concentration of 1:10,000. It is then ordinarily diluted to an antigen content affording about 12 protective units per total immunizing dose, corresponding ordinarily to the range of about 12.5 to 25 opacity units per milliliter, this being the potency range commonly employed for injection.

For most effective extraction, the pH should be above 8.5 and below 10.5, the optimum range being between about 9.8 and about 10.2. Below pH 9.8, the extraction becomes progressively less efficient, and above pH 10.2 the antigen tends to become inactivated. A variety of basic substances can satisfactorily be employed for adjusting the extraction mixture to the desired pH range, including trisodium orthophosphate, sodium carbonate, potassium hydroxide, 2-amino-2-methyl-1,3-propanediol, tris(hydroxymethyl)aminomethane, and the like. In all cases, it is important for the extraction medium to have a saline content in the region of about 1 molar (e.g., 0.5 to 1.5 molar) for most satisfactory results. At lower concentrations, the extraction becomes inefficient, while at higher concentrations, the extract is undesirably hypertonic.

The temperature employed in the extraction should be well below the minimum level at which the growth processes of the organism go forward to any substantial extent, in order to minimize any destructive effect upon the pertussis antigen. The temperature should be below about 10° C., and is preferably around 2 to 5° C.

The concentration of cells in the extraction mixture is important. For most effective extraction, the concentration of cells should be below about 200 opacity units per milliliter. In order to obtain a product of adequate potency without resorting to a concentrating technique, it is important to have the proportion of cells as high as possible, suitable above about 25 opacity units per milliliter and preferably around 100 opacity units per milliliter.

The extraction time is also important, since a short extraction period is ineffective, while a prolonged extraction is destructive to the antigen. The extraction time should be greater than one hour, and preferably between about 4 and about 40 hours.

At the end of the extraction period, the extraction mixture is preferably adjusted to around the neutral level by addition of sterile acid prior to centrifugation. The centrifugation may, however, be carried out without preliminary pH adjustment if carried out rapidly or if the temperature is held below about 10° C. In any event, the extract should be neutralized before being exposed to ordinary temperatures for any substantial length of time.

The antigen solution may, if desired, be subjected to dialysis against water to reduce the saline content to a level approaching that of physiological saline solution. For this purpose, conventional dialysis membranes, techniques, and conditions are suitable.

The invention will be more clearly understood from the following operating example, which is submitted only for the purpose of illustrating the invention, and not by way of limitation.

*Example*

Charcoal agar medium (16 liters), prepared according to the method of Powell et al., Public Health Reports, 66, 346 (1951), was dispensed in equal portions into 40 Povitsky bottles, where the medium was allowed to solidify. Each bottle was seeded with 10 mil. of a saline suspension of *B. pertussis* cells from a 24-hour charcoal agar culture. The seeded bottles were incubated at 35–37° C. for 48 hours, at the end of which time the organisms were washed from the surface of the medium in each bottle with 50 ml. of physiological saline solution. The washings thus obtained were found to measure about 2100 ml. and to contain 60 billion cells per milliliter, or 60 opacity units per milliliter. The washings were centrifuged, and the supernatant was discarded. The cells were resuspended in 1008 ml. of physiological saline solution. To the suspension were added in succession 2218 ml. of 5.5 M sodium chloride solution, 20.2 ml. of 0.6 M trisodium orthophosphate solution, and 10 ml. of physiological saline solution. The mixture was adjusted to pH 10.0 by ading 2 ml. of 10 percent hydrochloric acid. The final mixture, being about 1 M in sodium chloride and about 0.01 M in sodium orthophosphate, and containing 100 opacity units per milliliter, was stored in a chill room at 2–5° C. for 24 hours. At the end of this time, it was centrifuged, and the cells were discarded. The clear antigen-containing liquid thus obtained was tested for potency by injection into mice and challenging with 100,000 *B. pertussis* organisms given intracerebrally, in accordance with the standard NIH pertussis potency test. The dose-survival relationship was as follows.

| Dose, ml. | Survival, percent |
|---|---|
| 0.015 | 100 |
| 0.003 | 69 |
| 0.0006 | 12 |

I claim:

1. An improved method for preparing *Bordetella pertussis* antigen which comprises growing *Bordetella pertussis* upon the surface of a solid nutrient medium, washing the cells therefrom with physiological saline solution, separating the cells from the resulting suspension, subjecting the cells to contact for a period in excess of one hour with an extractant solution having a saline content between about 0.5 and about 1.5 molar at a temperature between about 2 and about 10° C., and a pH above 8.5 and below 10.5, and separating the resulting antigen extract from the exhausted cells.

2. An improved method for preparing *Bordetella pertussis* antigen which comprises growing *Bordetella pertussis* upon the surface of a solid nutrient medium, washing the cells therefrom with physiological saline solution, separating the cells from the resulting suspension, subjecting the cells to contact for a period in excess of one hour with an extractant solution having a saline content between about 0.5 and about 1.5 molar at a temperature between about 2 and about 10° C., a pH above 8.5 and below 10.5, and a cell concentration equivalent to between about 25 and about 200 opacity units per milliliter, and separating the resulting antigen extract from the exhausted cells.

3. An improved method for preparing *Bordetella pertussis* antigen which comprises growing *Bordetella pertussis* upon the surface of a solid nutrient medium, washing the cells therefrom with physiological saline solution, separating the cells from the resulting suspension, subjecting the cells to contact for a period of about 4 to about 40 hours with an extractant solution having a saline content of about 1 molar at a temperature between about 2 and about 10° C., a pH of about 9.8 to about 10.2, and a cell concentration equivalent to between about 25 and about 200 opacity units per milliliter, and separating the resulting antigen extract from the exhausted cells.

4. An improved method for preparing *Bordetella pertussis* antigen which comprises growing *Bordetella pertussis* upon the surface of a solid nutrient medium, washing the cells therefrom with physiological saline solution, separating the cells from the resulting suspension, subjecting the cells to contact for a period of about 20 to about 30 hours with an extractant solution having a saline content of about 1 molar at a temperature between about 2 and about 10° C., a pH of about 10, and a cell concentration equivalent to about 100 opacity units per milliliter, and separating the resulting antigen extract from the exhausted cells.

References Cited in the file of this patent

UNITED STATES PATENTS

| 2,105,486 | Langer | Jan. 18, 1938 |
| 2,371,002 | Strean | Mar. 6, 1945 |
| 2,837,460 | Behrens | June 3, 1958 |
| 2,965,543 | Thiele | Dec. 20, 1960 |

OTHER REFERENCES

Bergey's Manual of Determinative Bacteriology, Williams & Wilkins, 1957, pp. 402–3.